(12) United States Patent
Seifert et al.

(10) Patent No.: US 9,296,476 B2
(45) Date of Patent: Mar. 29, 2016

(54) SELF TUNING VIBRATION ABSORBER

(75) Inventors: Michael Seifert, Southlake, TX (US);
Frank Bradley Stamps, Colleyville, TX (US); Michael R. Smith, Colleyville, TX (US); David E. Heverly, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 633 days.

(21) Appl. No.: 13/450,060

(22) Filed: Apr. 18, 2012

(65) Prior Publication Data
US 2013/0282204 A1    Oct. 24, 2013

(51) Int. Cl.
| B64C 27/00 | (2006.01) |
| F16F 15/00 | (2006.01) |
| F16F 7/10  | (2006.01) |

(52) U.S. Cl.
CPC ............. B64C 27/001 (2013.01); F16F 7/1005 (2013.01); F16F 15/00 (2013.01); *B64C 2027/004* (2013.01)

(58) Field of Classification Search
CPC ...... F16F 15/00; F16F 7/1005; B64C 27/001; B64C 2027/004
See application file for complete search history.

(56) References Cited

U.S. PATENT DOCUMENTS

| | | | |
|---|---|---|---|
| 3,508,246 A * | 4/1970 | Lenz | 341/6 |
| 4,236,607 A | 12/1980 | Halwes et al. | |
| 4,766,984 A | 8/1988 | Gaffey et al. | |
| 5,337,864 A | 8/1994 | Sjoestroem et al. | |
| 5,435,531 A | 7/1995 | Smith et al. | |
| 5,439,082 A | 8/1995 | McKeown et al. | |
| 5,704,596 A | 1/1998 | Smith et al. | |
| 5,732,905 A | 3/1998 | Krysinski | |
| 5,788,029 A | 8/1998 | Smith et al. | |
| 5,814,963 A * | 9/1998 | Girard et al. | 318/611 |
| 6,009,983 A | 1/2000 | Stamps et al. | |
| 6,193,206 B1 | 2/2001 | Yasuda et al. | |
| 6,279,704 B1 | 8/2001 | Manfredotti | |
| 6,695,106 B2 | 2/2004 | Smith et al. | |
| 6,954,686 B2 | 10/2005 | Aubourg et al. | |
| 2006/0175169 A1 | 8/2006 | Or et al. | |
| 2008/0191648 A1 | 8/2008 | Ito et al. | |

FOREIGN PATENT DOCUMENTS

| DE | 19832697 | 2/2000 |
| GB | 2480785 | 11/2011 |

OTHER PUBLICATIONS

European Search Report dated Oct. 9, 2012 from counterpart EP App. No. 12178977.0.

(Continued)

*Primary Examiner* — John Q Nguyen
*Assistant Examiner* — Michael Kerrigan
(74) *Attorney, Agent, or Firm* — James E. Walton

(57) ABSTRACT

A system and method to adjustably create a reacting force in response to a vibrating force of a vibrating structure. The system includes an adjustable vibration absorber that creates a range of reacting forces. The method includes continuously monitoring the reacting force and the vibrating force with a sensor system operably associated with a control unit having an algorithm to determine if adjustment of the vibration absorber is required. If required, the control unit commands a driver to selectively adjust the vibration absorber such that the reacting force equals the vibrating force.

12 Claims, 11 Drawing Sheets

(56) References Cited

OTHER PUBLICATIONS

European Search Report dated Mar. 11, 2013 from counterpart EP App. No. 12178977.0.

Office Action dated May 26, 2014 from counterpart CA App. No. 2808987.

* cited by examiner

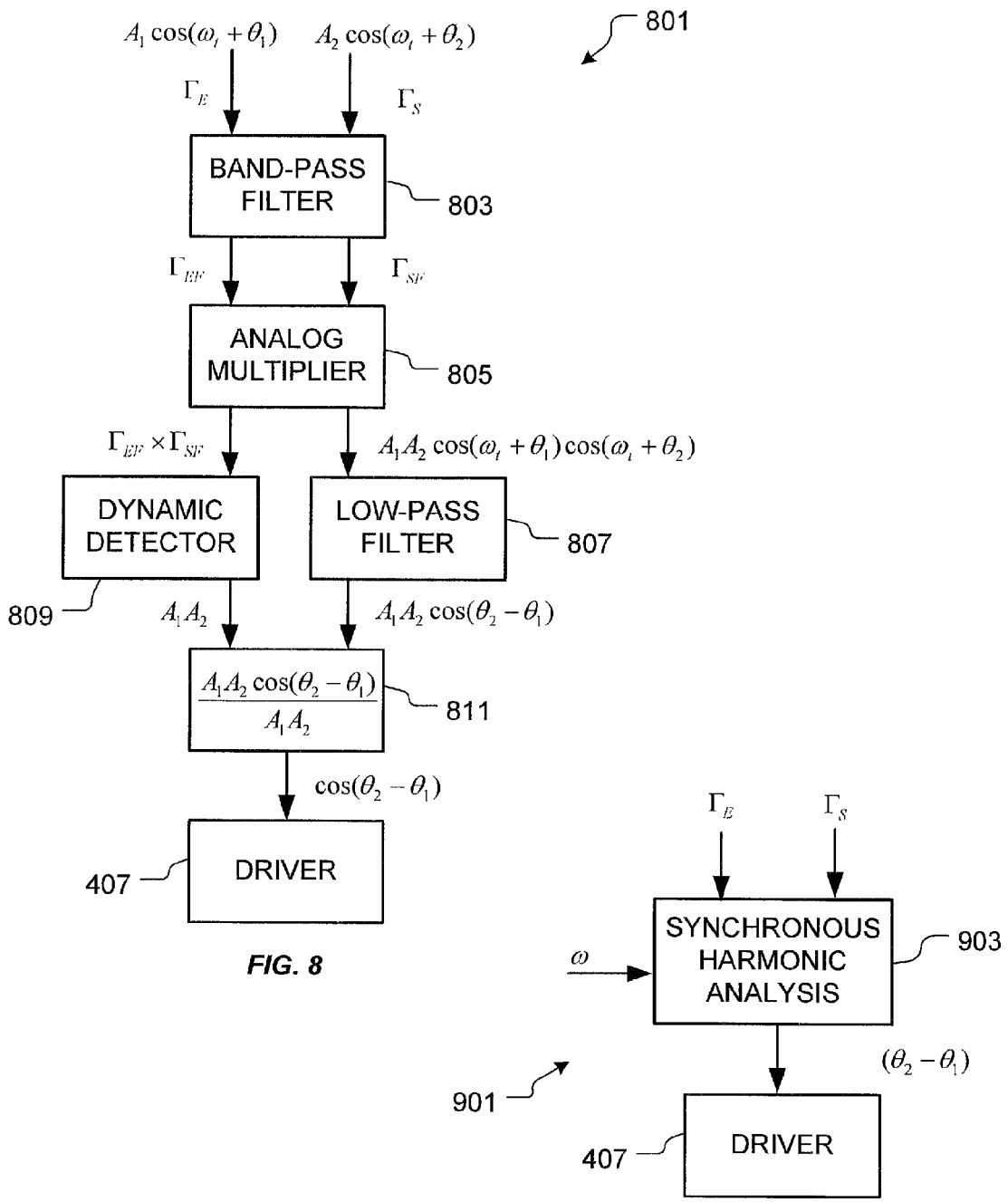

SELF TUNING VIBRATION ABSORBER

BACKGROUND

1. Field of the Invention

The present application relates generally to vibration control systems, and more specifically, to a tunable vibration system and method of same. The present application is well suited for use in the aircraft industry, in particular, helicopters, tiltrotor, and other rotor wing aircraft.

2. Description of Related Art

Vibration absorbers are well known in the art for effectively reducing, and in most cases eliminating, the vibrations of structures subject to harmonic or oscillating displacements or forces. During operation, the vibrations can cause damage to the support structures and/or other operably associated systems. The vibration absorber is configured to create a reacting force that cancels the vibrating force, and in some embodiments, the reacting force is predetermined prior to operation. It should be understood that the vibrating forces change over time or during flight conditions, for example, changing rotor RPM speeds.

In one known embodiment, a rotary system utilizes a tunable vibration absorber that creates a range of reacting forces in response to changing vibrating forces. For example, U.S. Pat. No. 5,814,963 to Girard et al. illustrates a system of the type described and is generally indicative of a current state-of-the art rotary system with a vibration absorber. In Girard et al., the conventional vibration absorber utilizes a main mass and an auxiliary mass suspended at a distance relative to the vibrating structure and coupled thereto via an elastic beam. As the vibrations change, the system is configured to adjust the auxiliary mass relative to the vibrating structure, thereby changing the reacting force. It should be understood that the motor operably associated with adjusting the auxiliary mass is not attached to the structure subject to dynamic stresses. This feature greatly reduces the life expectancy of the motor and operably associated equipment.

Although great strides have been made in the field of vibration absorbers, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIGS. 8-11 are flowcharts depicting exemplary control algorithms for the vibration system of FIG. 4;

Figure 1:
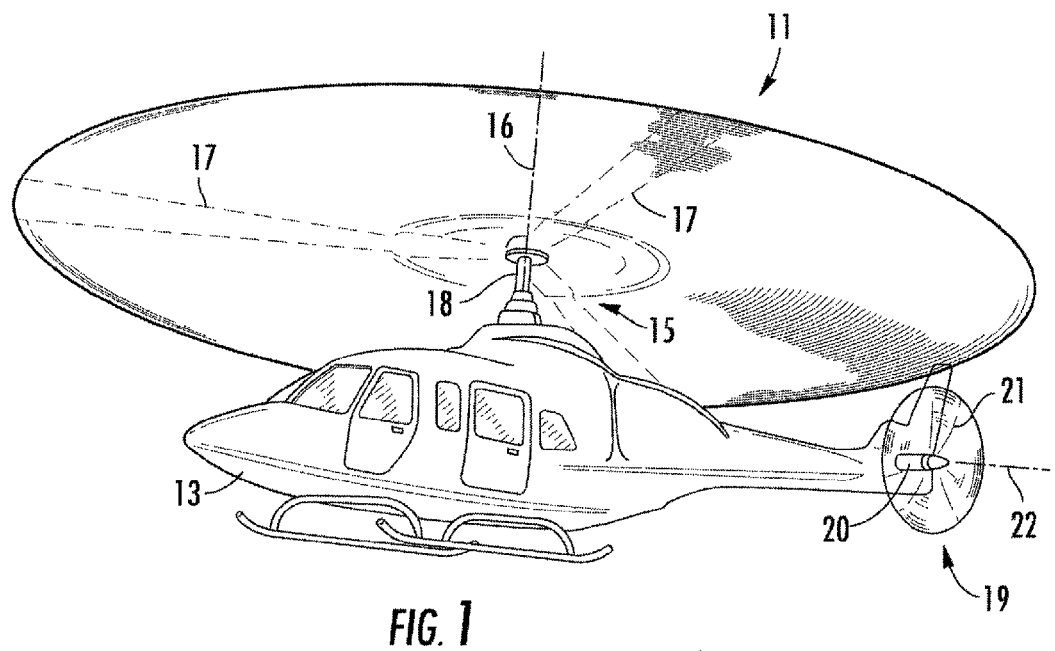
FIG. 1 is a perspective view of a helicopter according to the present application.

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the system and method are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of the present application overcomes common disadvantages associated with conventional vibration systems. Specifically, the system continuously monitors developments in vibrations of the vibrating structure and adjusts an absorber to counteract these vibrations. To achieve these features, the system is provided with one or more sensors associated with the absorber and the vibrating structure for sensing any changes in vibrations. The sensors create a signal that is subsequently relayed to a control unit. The control unit utilizes one or more control algorithms for analyzing the input signals and for determining whether adjustment of the absorber is required. If adjustment is required, the control unit commands a driver to selectively adjust the absorber until a desired reacting force is created. Further detailed description of these features are provided below and illustrated in the accompanying drawings.

The system and method of the present application will be understood, both as to its structure and operation, from the accompanying drawings, taken in conjunction with the accompanying description. Several embodiments of the assembly are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that features, elements, and/or functions of one embodiment may be incorporated into another embodiment as appropriate, unless described otherwise.

Referring now to the drawings wherein like reference characters identify corresponding or similar elements throughout the several views, FIG. 1 shows a helicopter 11 according to the present application. Helicopter 11 has a fuselage 13 and a main rotor assembly 15, including main rotor blades 17 and a main rotor shaft 18. Helicopter 11 has a tail rotor assembly 19, including tail rotor blades 21 and a tail rotor shaft 20. Main rotor blades 17 generally rotate about a vertical axis 16 of main rotor shaft 18. Tail rotor blades 21 generally rotate about a lateral axis 22 of tail rotor shaft 20. Helicopter 11 also includes a vibration system according to the present application for absorbing fuselage 13 or other portions of helicopter 11 from mechanical vibrations, such as harmonic vibrations, which are associated with the propulsion system and which arise from the engine, transmission, and rotors of helicopter 11.

Figure 2A:
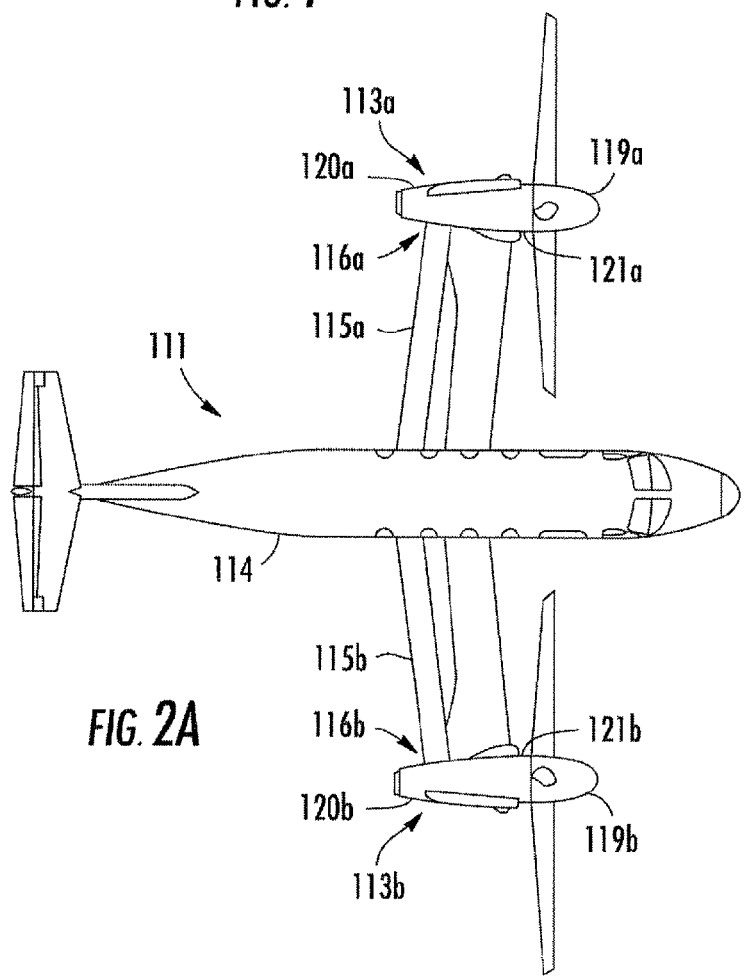
FIG. 2A is a plan view of a tilt rotor aircraft according to the present application during airplane mode.
Figure 2B:
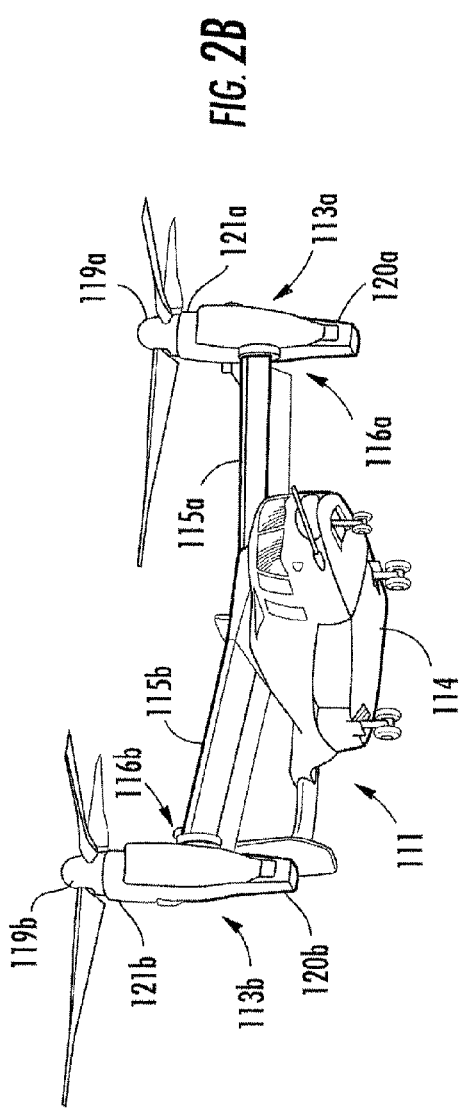
FIG. 2B is a perspective view of a tilt rotor aircraft according to the present application during helicopter mode.

The system of the present application may also be utilized on other types of rotary wing aircraft. Referring now to FIGS. 2A and 2B in the drawings, a tilt rotor aircraft 111 according to the present application is illustrated. As is conventional with tilt rotor aircraft, rotor assemblies 113a and 113b are carried by wings 115a and 115b, and are disposed at end portions 116a and 116b of wings 115a and 115b, respectively. Tilt rotor assemblies 113a and 113b include nacelles 120a and 120b, which carry the engines and transmissions of tilt rotor aircraft 111, as well as, rotor hubs 119a and 119b on forward ends 121a and 121b of tilt rotor assemblies 113a and 113b, respectively.

Tilt rotor assemblies 113a and 113b move or rotate relative to wing members 115a and 115b between a helicopter mode in which tilt rotor assemblies 113a and 113b are tilted upward, such that tilt rotor aircraft 111 flies like a conventional helicopter; and an airplane mode in which tilt rotor assemblies 113a and 113b are tilted forward, such that tilt rotor aircraft 111 flies like a conventional propeller driven aircraft. In FIG. 2A, tilt rotor aircraft 111 is shown in the airplane mode; and in FIG. 2B, tilt rotor aircraft 111 is shown in the helicopter mode. As shown in FIGS. 2A and 2B, wings 115a and 115b are coupled to a fuselage 114. Tilt rotor aircraft 111 may also include a vibration system according to the present application fuselage 114 or other portions of tilt rotor aircraft 111. An example of the vibratory forces discussed herein include mechanical vibrations, such as harmonic vibrations, which are associated with the propulsion system and which arise from the engines, transmissions, and rotors of tilt rotor aircraft 111.

Figure 3:
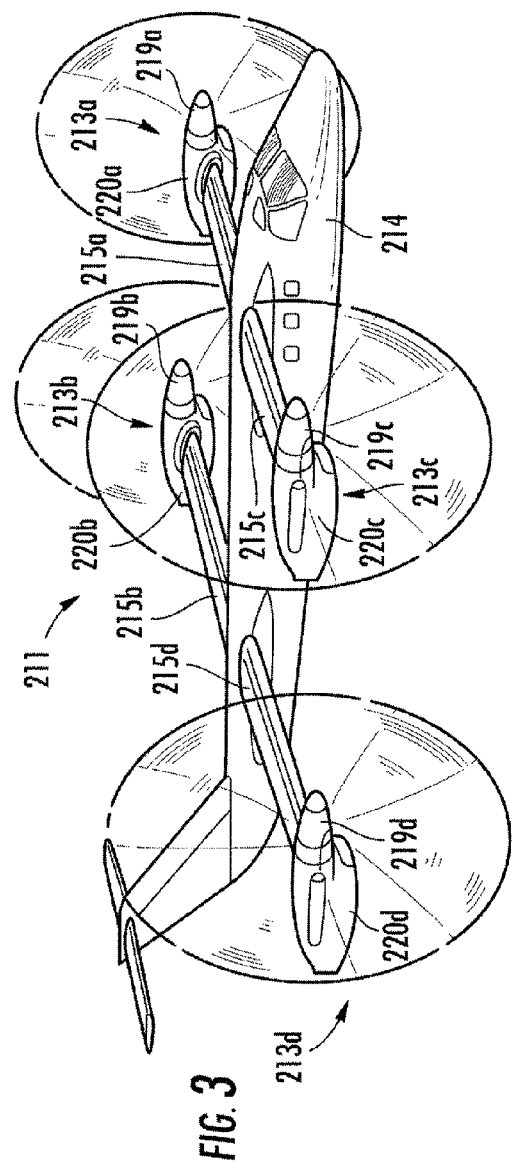
FIG. 3 is a perspective view of a quad tilt rotor aircraft according to the present application during airplane mode.

Referring now to FIG. 3 in the drawings, a quad tilt rotor aircraft 211 according to the present application is illustrated. As with the tilt rotor aircraft 111 of FIGS. 2A and 2B, rotor assemblies 213a, 213b, 213c, and 213d are carried by a forward wing 215a, 215c, and an aft wing 215b, 215d, respectively. Tilt rotor assemblies 213a, 213b, 213c, and 213d include nacelles 220a, 220b, 220c, and 220d, which carry the engines and transmissions of quad tilt rotor aircraft 211, as well as, rotor hubs 219a, 219b, 219c, and 219d on forward ends of tilt rotor assemblies 213a, 213b, 213c, and 213d, respectively.

Tilt rotor assemblies 213a, 213b, 213c, and 213d move or rotate relative to wing members 215a, 215b, 215c, and 215d between a helicopter mode in which tilt rotor assemblies 213a, 213b, 213c, and 213d are tilted upward, such that quad tilt rotor aircraft 211 flies like a conventional helicopter; and an airplane mode in which tilt rotor assemblies 213a, 213b, 213c, and 213d are tilted forward, such that quad tilt rotor aircraft 211 flies like a conventional propeller driven aircraft. In FIG. 3, quad tilt rotor aircraft 111 is shown in the airplane mode. As shown in FIG. 3, wings 215a, 215b, 215c, and 215d are coupled to a fuselage 214. Tilt rotor aircraft 211 also includes a vibration system according to the present application for counteracting fuselage 214 or other portions of quad tilt rotor aircraft 211 from mechanical vibrations, such as harmonic vibrations, which are associated with the propulsion system and which arise from the engines, transmissions, and rotors of quad tilt rotor aircraft 211.

It should be understood that the system and method of the present application may be employed with different types of aircraft on which it is desirable to have vibration control. Further, the system could be utilized with other types of vehicles or machinery, for example, a land based vehicle having structures subject to harmonic vibrations.

Figure 4:
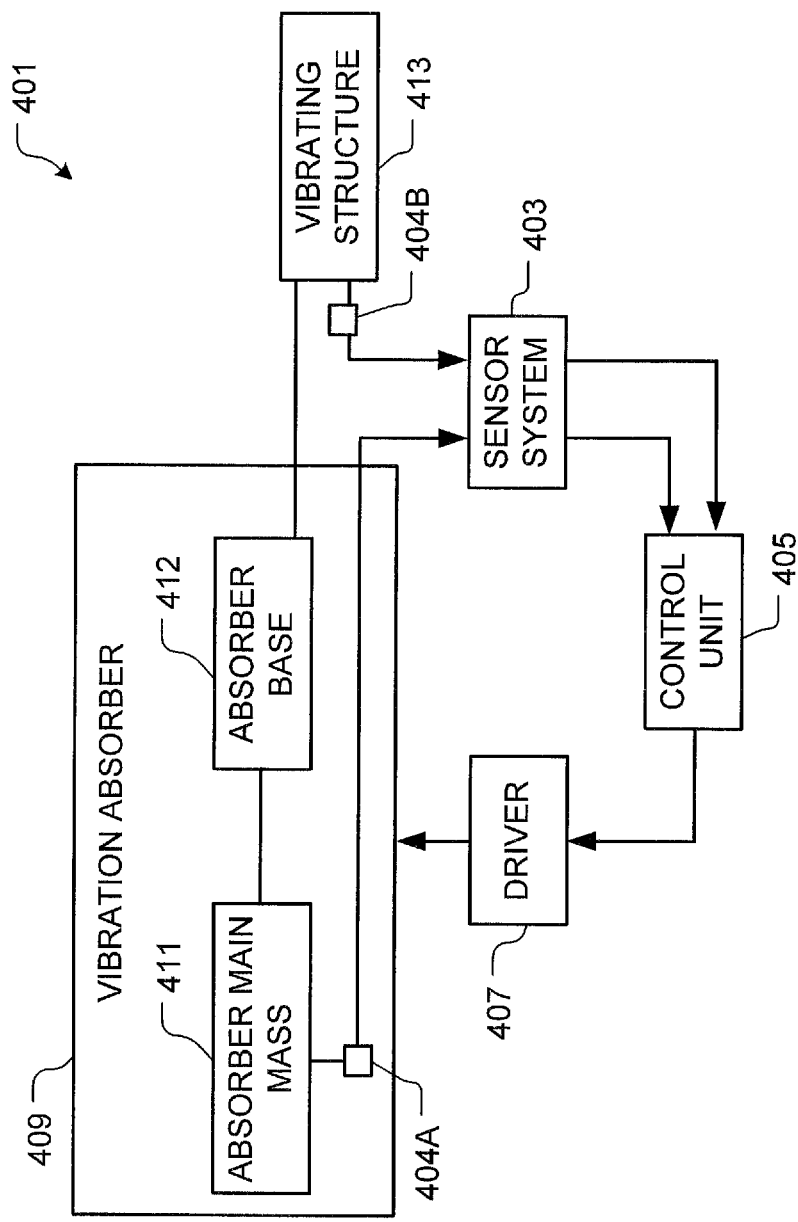
FIG. 4 is a simplified schematic of a vibration system according to the preferred embodiment of the present application.

Turning next to FIG. 4 in the drawings, a simplified schematic of a vibration absorber system 401 is shown according to the preferred embodiment of the present application. FIG. 4 illustrates a plurality of subsystems and devices operably associated with system 401 and the interaction therebetween, as indicated with a plurality of arrows and interconnecting lines. It will be appreciated that system 401 provides effective means for monitoring and controlling the vibrations created by the vibrating structure.

In the preferred embodiment, system 401 comprises of a sensor system 403 for sensing and relaying sensed data to a control unit 405, which in turn analyzes the sensed data with one or more control algorithms. Thereafter, the control unit 405 commands a driver 407 to selectively adjust a tunable absorber 409. It is contemplated having an absorber with a main mass 411 associated with a base 412 that attaches to the vibrating structure 413.

Sensor system 403 preferably utilizes two sensors associated with the vibrating structure 413 and the absorber 409. Specifically, a first sensor 404A is used to sense the vibration frequency responses of the tunable absorber 409 and a second sensor 404B is utilized to measure vibration motion of the vibrating structure 413, which has a characteristic amplitude, frequency, and phase. The types of sensors contemplated herein are accelerometers; however, the sensor system 403 has application with all different types of sensors, for example, stress/strain sensors, displacement sensors, and tachometers, and/or other suitable sensors.

It should be appreciated that FIG. 4 also illustrates a control loop, wherein system 401 continuously monitors changes in vibrations via the vibration sensors during operation, and thereafter responds to these changes by adjusting absorber 409.

Figure 5:
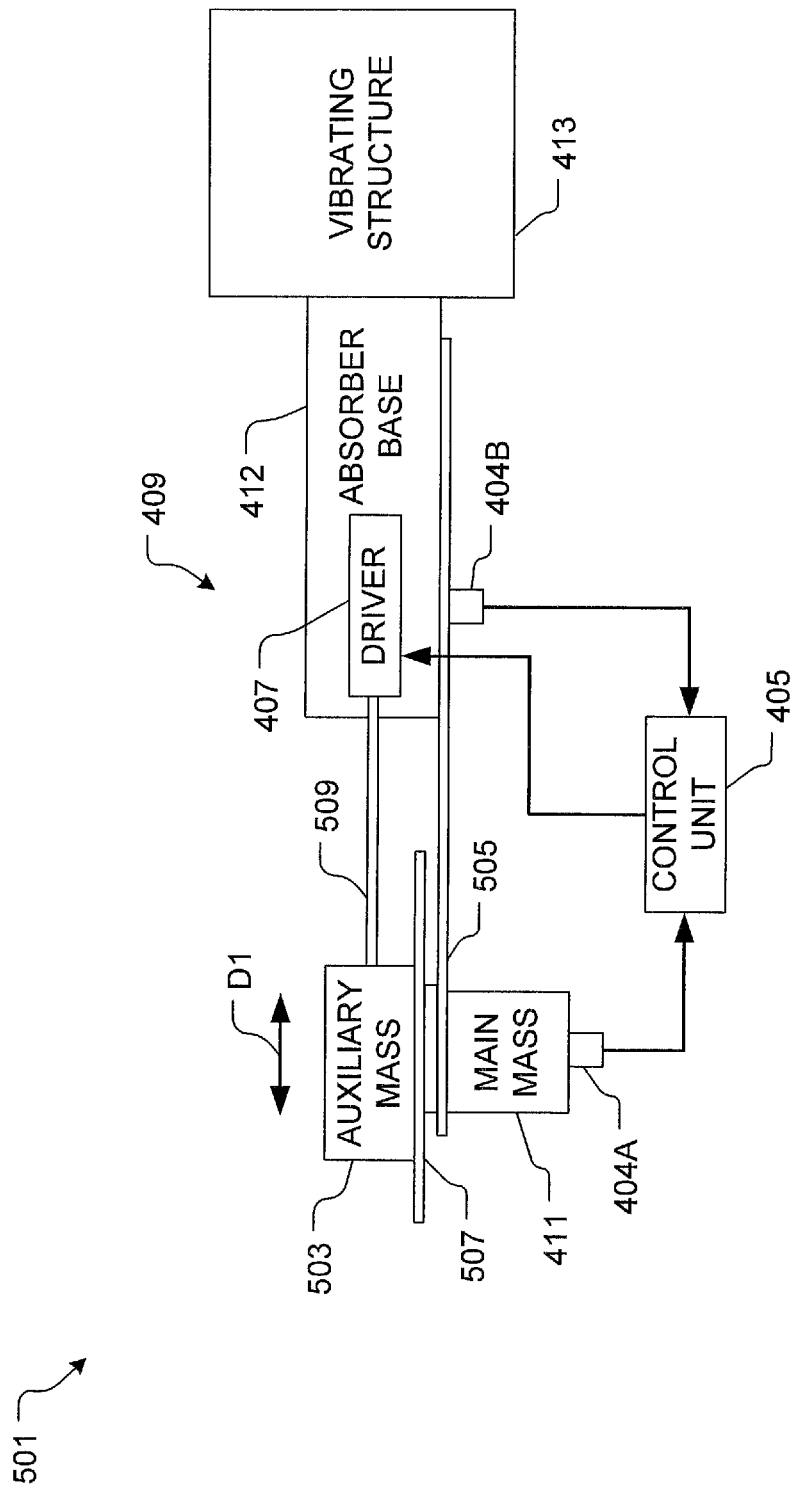
FIG. 5-7 are simplified schematics of different embodiments of the vibration system of FIG. 4.
Figure 6:
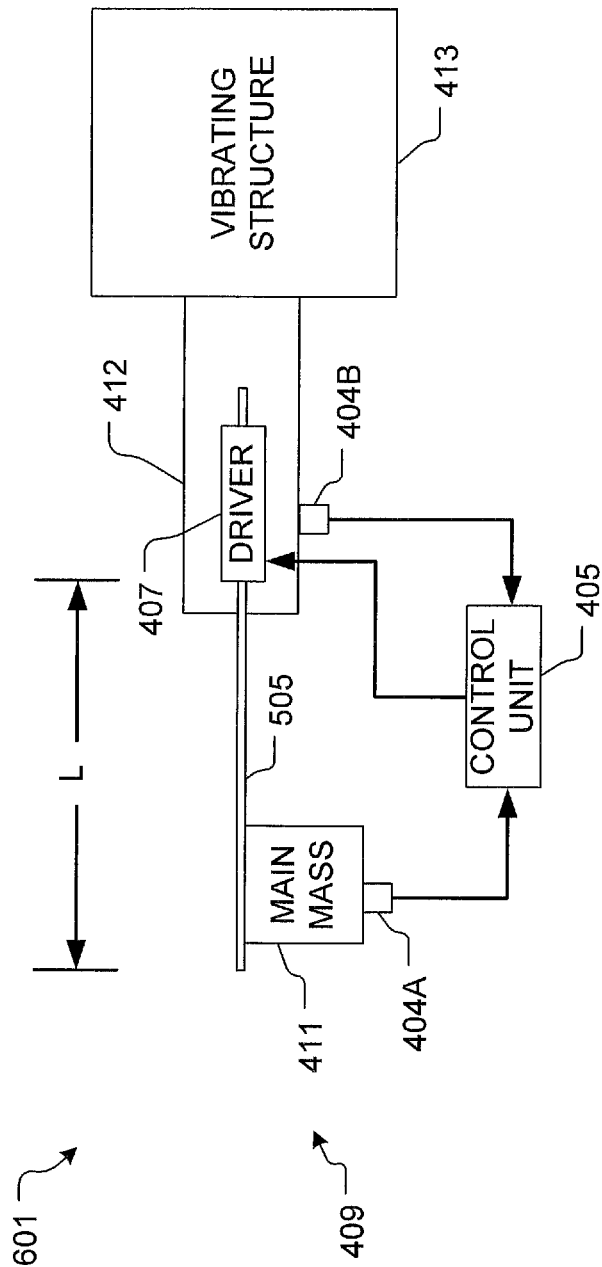
Figure 7:
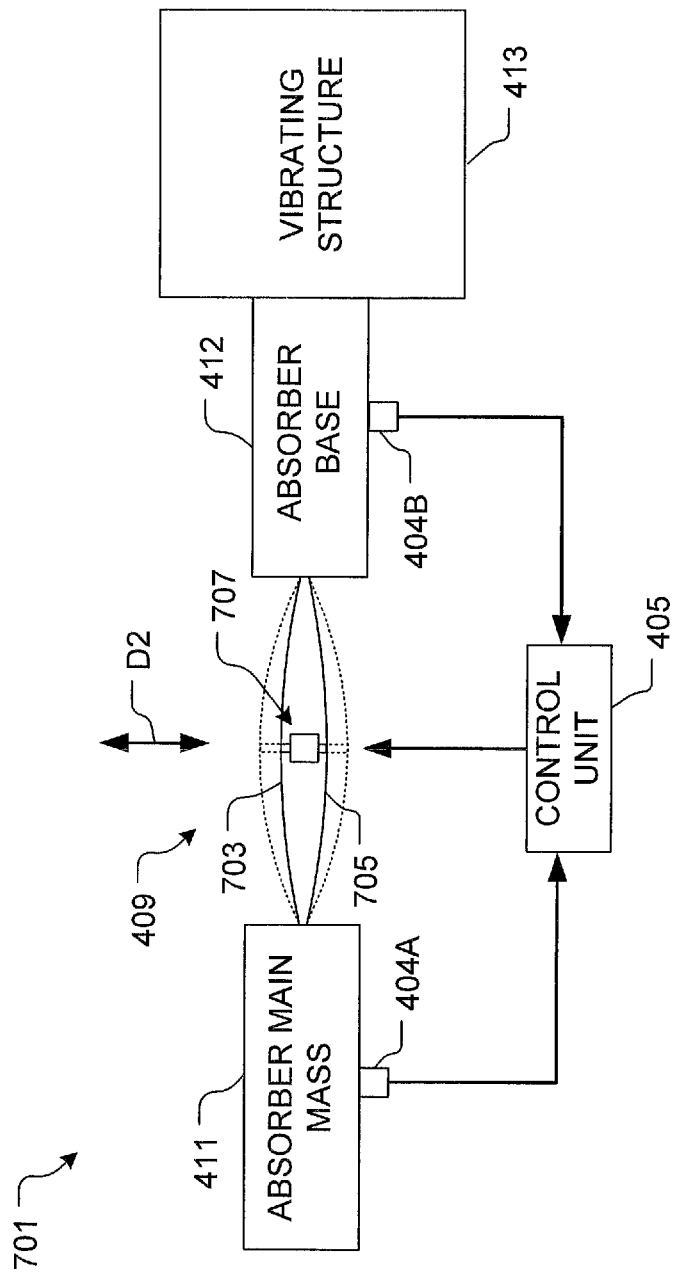

The following FIGS. 5-7 illustrate three exemplary embodiments of system 401 having three different types of tunable absorbers 409. While the present application discloses three different embodiments, it will be appreciated that the vibration system discussed herein is easily adapted for use with alternative embodiments of tunable vibration absorbers.

For ease of description, not all of the required subsystems and devices operably associated with system 401 are shown. For example, the necessary connectors, power sources, mounting supports, circuitry, software, control systems, and so forth are not all shown in order to clearly depict the novel features of the vibration system. However, it should be understood that the embodiments disclosed herein are operably associated with these and other required systems and devices for operation, as conventionally known in the art, although not fully discussed and depicted in the drawings.

In FIG. 5, a simplified schematic of one embodiment of the vibration absorber system 401 is shown. In this embodiment, vibration absorber system 501 overcomes common disadvantageous associated with the conventional vibration absorbers by attaching the driver 407 directly to the vibrating structure 413. In this contemplated embodiment, the driver 407 does not experience the adverse vibrating forces from moving mass 411, thereby increasing the life expectancy of the driver, which is a significant feature in the aircraft industry.

Vibration control system 501 comprises one or more of an absorber 409 having a main mass 411 and an auxiliary mass 503 associated therewith as means for selectively tuning the vibration absorber 409 to create a reacting force to match the vibrating force of structure 413. Main mass 411 is held in a fixed position relative to structure 413 via a flexible beam 505. It should be understood that main mass 411 remains in a fixed position, while auxiliary mass 503 is controllably adjusted on a plate 507 in direction D1 relative to structure 413. During operation, driver 407 selectively translates mass 503 relative to mass 411 via a linkage 509 in response to commands from control unit 405.

Vibration system 501 further comprises a first sensor 404A operably associated with the absorber main mass 411 and a second sensor 404B operably associated with the vibrating structure 413 to which the absorber is attached. In the contemplated embodiment, both sensors 404A and 404B are configured to detect vibrations and/or accelerations of respective absorber 409 and structure 413. Thereafter, both sensors 404A and 404B relay the sensed vibration data to control unit 405. The control unit 405 utilizes the sensed data to adjust the absorber 409, more specifically, to adjust auxiliary mass 503 relative to main mass 411. This cantilevered mass configuration is an effective means for adjusting the response of the absorber.

In the preferred embodiment, driver 407 is a motor conductively coupled to control unit 405. However, it should be appreciated that alternative embodiments could utilize different driving means, for example, a hydraulic system, in lieu of the preferred embodiment. Also, sensors 404A and 404B are preferably accelerometers configured to detect the amplitude, frequency, and phase of vibrating bodies; however, alternative embodiments could employ different types of sensors for providing such suitable sensory inputs for detecting changes in the vibratory forces.

In FIG. 6, a simplified schematic of an alternative embodiment of vibration absorber system 401 is shown. In this embodiment, vibration absorber system 601 is substantially similar to system 501, wherein both systems utilize adjustable absorbers to control vibrating forces from a vibrating structure. However, system 601 is further provided with the feature of adjusting the position of main mass 411 relative to the structure 413 by extending and retracting the flexible beam 505 relative to vibrating structure 413. This simplified feature could possibly include a telescoping beam, wherein the beam telescopically extends and retracts, thereby increasing the cantilevered length L of beam 505 relative to structure 413. In another embodiment, driver 407 could include a fixed length and the driver 407 could be configured to translate beam 505, thereby adjusting the cantilevered length L extending from structure 413.

In FIG. 7, a simplified schematic of an alternative embodiment of system 401 is shown. In this exemplary embodiment, vibration absorber system 701 utilizes a leaf spring apparatus having a first spring element 703 extending generally parallel to and alongside a second spring element 705. It will be appreciated that elements 703 and 705 are composed of a flexible, elastic material that allows the elements to elastically extend in a direction D2 away from each other. Elements 703 and 705 attach to both structure 413 and the main mass 411. Disposed between and attached to elements 703 and 705 is a driver 707 for adjusting the spaced relationship there between, as indicted with the phantom lines.

The leaf spring configuration of absorber 409 provides one or more unique features, namely, as the two elements are separated, the overall stiffness of the absorber is increased as a result of the nonlinearity of the spring elements. The nonlinearity is caused by geometrical changes as well as the elongation of the spring elements. These two mechanisms work together to achieve the resulting changes in stiffness, with the elongated effect contributing most to the stiffening of the spring. The geometric stiffening effect is due to the change in the geometric form of the spring as the two elements are separated. The geometrical form of the leaf spring with the elements separated is much stiffer than the relaxed position.

FIGS. 8-11 depict various schematic views of different control algorithms employed by control unit 405. Control unit 405 utilizes one or more of these algorithms for continuously monitoring changes in vibrations and for adjusting absorber 409 accordingly.

FIG. 8 illustrates an exemplary algorithm 801 that determines changes in relative phase angles between the two input signals. The process includes receiving and analyzing a first signal from a first sensor 404A operably associated with the absorber main moving mass and a second signal from a second sensor 404B operably associated with the vibrating structure. The two signals pass through a band-pass filter 803, wherein the signals are filtered and then multiplied with an analog multiplier 805. A voltage proportional to the cosine of the phase shift is obtained using a static low-pass filter 807 and a dynamic detector 809 of the product signal 811. The output relative phase change between the two signals is compared, and if the relative phase angle is not equal to 90 degrees, then the absorber is adjusted until such values are obtained via driver 407. The process is continuously repeated, thus providing real-time adjustment of the absorber.

FIG. 9 illustrates an exemplary control algorithm 901, wherein the two input signals are received and processed through a synchronous harmonic analysis 903. Specifically, the two signals are utilized in addition to the sensed frequency w, e.g., the rotational speed and position of the rotor blades to determine whether adjustment of absorber 409 is required. Thus, knowing these input signal values, it is then possible to displace the driver 407 having calculated the phase shift between the harmonics of the signals. It should be understood that synchronous harmonic analysis implies that both the rotor speed and rotor azimuth position are known, which are typically provided by a tachometer signal. Further discussion of these features is provided below with reference to FIG. 11.

Figure 10:
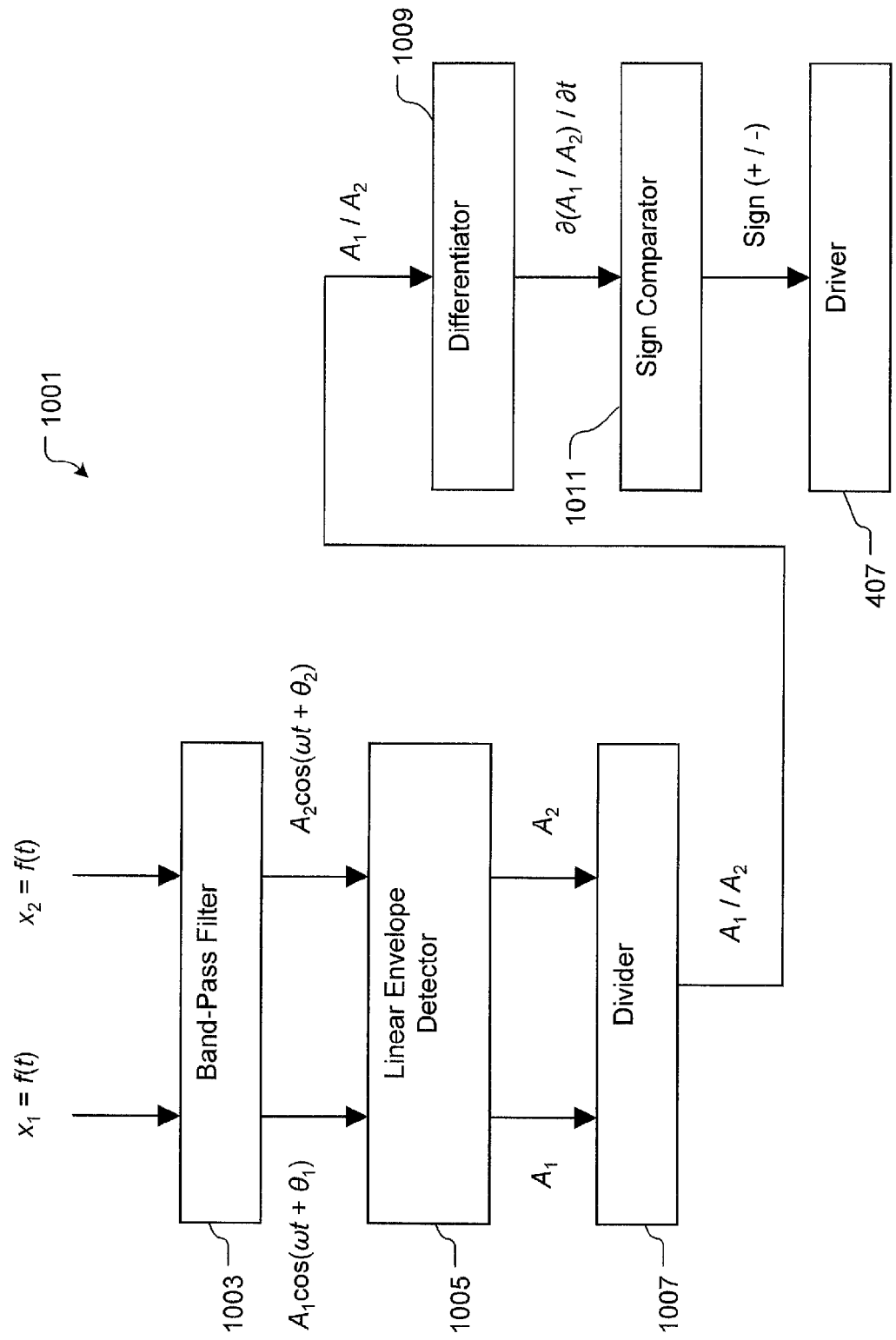

FIG. 10 depicts an exemplary control algorithm 1001 that compares the amplitudes of the two sensed vibration signals for determining whether adjustment of the absorber is required. The two signals from sensors 404B and 404A pass through a band-pass filter 1003 prior to being analyzed with a linear envelope detector 1005. The amplitudes A1 (404B) and A2 (404A) of the signals are determined and divided with divider 1007. Thereafter, the ratio of these amplitudes is differentiated with differentiator 1009 to obtain a slope of the resultant signal, which is then compared within a sign comparator 1011. The sign comparator 1011 determines whether the slope is zero, negative, or positive. If the slope is zero, then no adjustment of the absorber is required. On the other hand, if the slope is negative or positive, the driver adjusts the absorber accordingly such that a zero slope value is achieved. Further discussion of these features is provided below with reference to FIGS. 12A-C.

Figure 11:
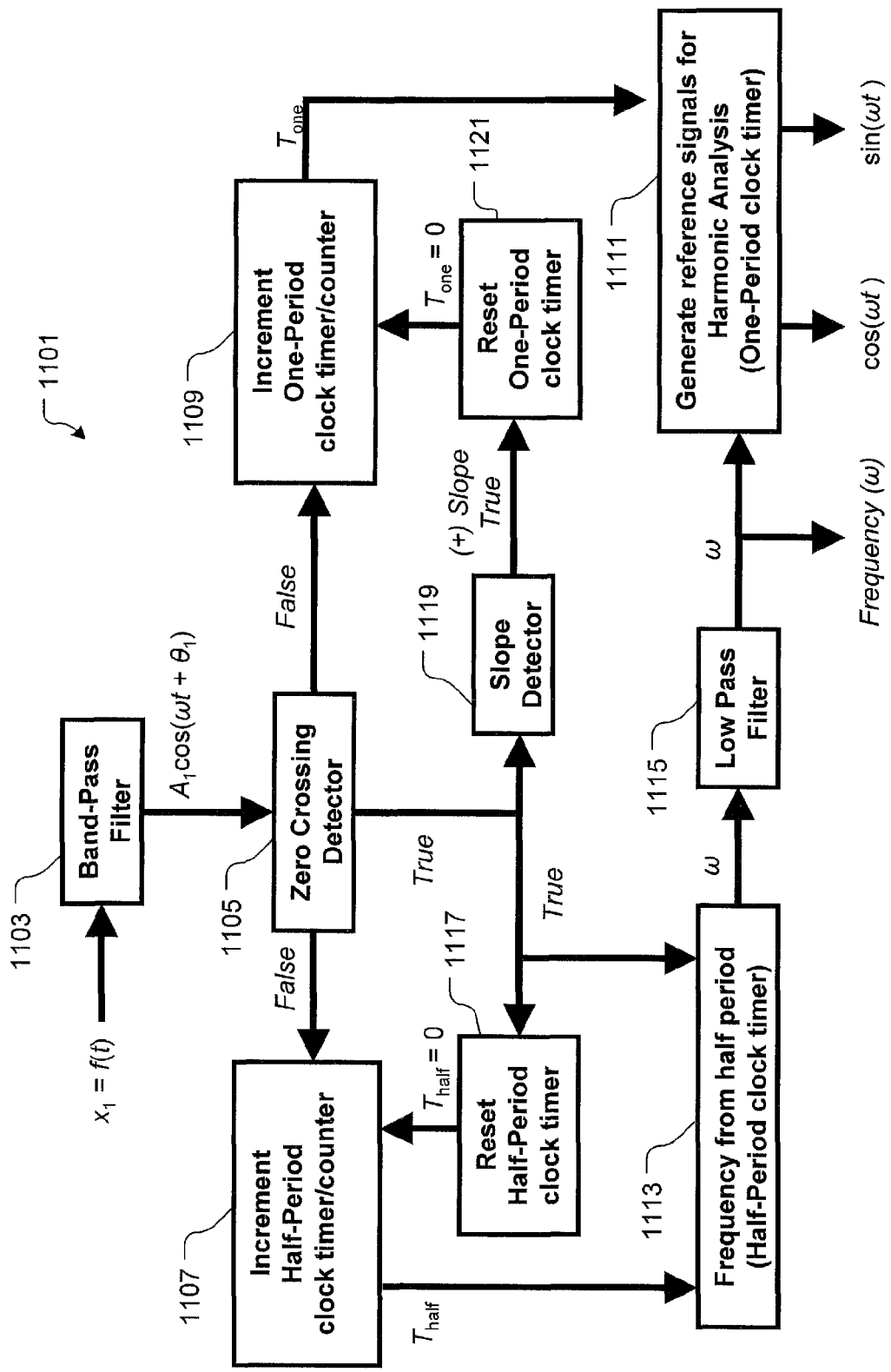

FIG. 11 depicts a schematic view of a control algorithm 1101 for generating the reference signals for algorithm 901. It will be appreciated that one of the unique features of algorithm 1101 is employing a single sensor, e.g., an accelerometer, for generating the output reference signals. In this process, an input signal, referred to as "x1=f(t)", passes through a band-pass filter 1103, and thereafter determined whether the sinusoidal wave has a zero crossing with a detector 1105. If no zero crossing is found, then the signal is analyzed with a half-period clock timer/counter 1107 and a one-period clock timer/counter 1109 for measuring time increments between zero crossings. It will be appreciated that if the time difference between zero crossings is known, then the frequency of the signal is also known. The incremental one-period time value "T_one" is then relayed to harmonic analysis 1111, while the frequency 1113 of incremental half period time value "T_half" passes through a low pass filter 1115 prior to being received by the harmonic analysis.

If the zero detection of the sinusoidal wave is found, then the half-period clock timer resets, as indicated with box 1117. Prior to resetting the one-period clock timer, as indicated in box 1121, the signal waveform passes through a slope detector 1119 that determines whether the slope is positive. The slope detector 1119 detects positive slope values and ignores negative slope values. If the slope is positive, then the one-period clock timer is reset.

Algorithm 1101 provides significant advantageous over conventional control processes for determining vibration harmonics, namely, a single sensor is employed to determine the harmonic content (frequency, amplitude, and phase); whereas, conventional algorithms require a tachometer, or similar means, in addition to an accelerometer to conduct the synchronous harmonic analysis.

Figure 12A:
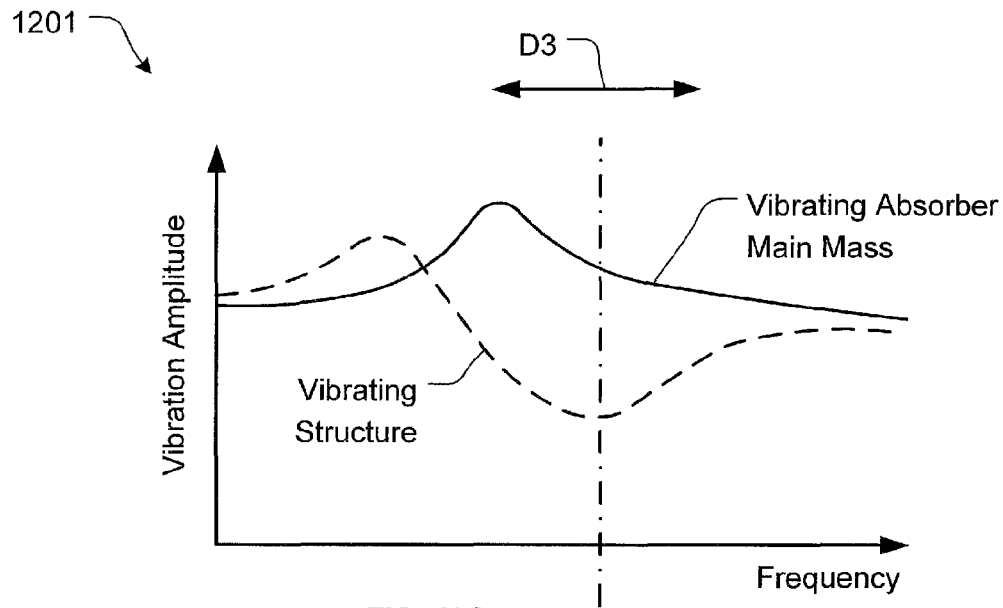
FIGS. 12A-C are exemplary plots showing a desired tuning response relative to a frequency response of a vibration absorber.
Figure 12B:
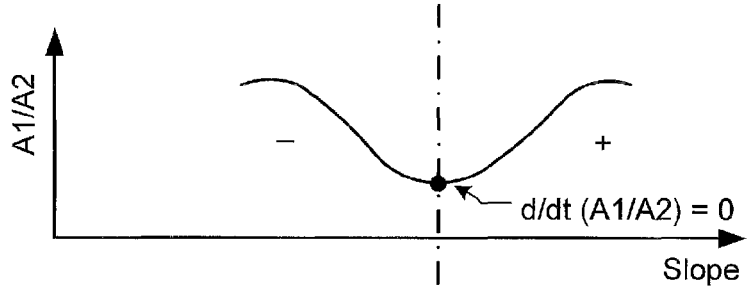
Figure 12C:
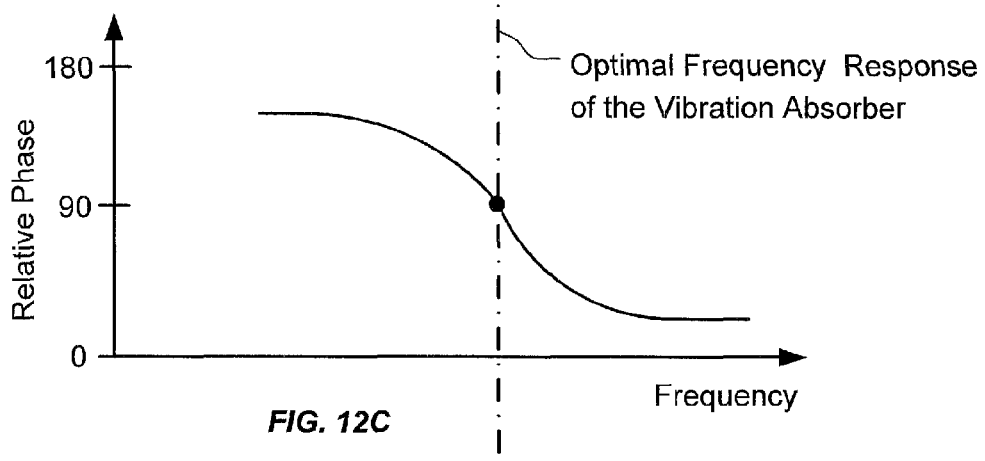

In FIGS. 12A-C, various plots 1201 are provided to depict the desired frequency response relative to the output response from the sensors. FIG. 12A illustrates the output of an amplitude range relative to the frequency of both the vibrating absorber main mass 411 represented as a solid line, and the vibrating structure 413 represented as a dashed line. An optimal tuning response is represented with the doted-dashed line, which is selectively located at the lowest amplitude, resulting in the optimal vibration control of the vibrating structure. An arrow D3 represents the movement of both the absorber mass and vibrating structure graphical lines as the absorber is adjusted.

It should be understood that algorithms 801 and 1001 incorporate different methods for determining frequency responses of the vibrating structure. Specifically, algorithm 801 utilizes the relative phase angle between the vibrating structure and the absorber; whereas, algorithm 1001 utilizes the slope of an amplitude ratio of the vibrating structure and the absorber. Both algorithms are utilized to determine whether adjustment of the absorber is required.

FIG. 12B shows the output of algorithm 1001 described above, wherein the slope of the amplitude ratio (A1/A2) is utilized to determine whether adjustment of the absorber is required. In particular, no adjustment is required when the slope equals zero, e.g., when d/dt (A1/A2)=0, because the absorber is effectively reacting to the vibrating forces. Whereas, if the slope is negative or positive, adjustment of the absorber is required.

FIG. 12C shows the output of algorithm 801 described above, wherein the relative phase changes are utilized to determine whether adjustment of the absorber is required. In particular, no adjustment is required when the relative phase is 90 degrees; whereas, adjustment is required with all other relative phase angles.

Figure 13:
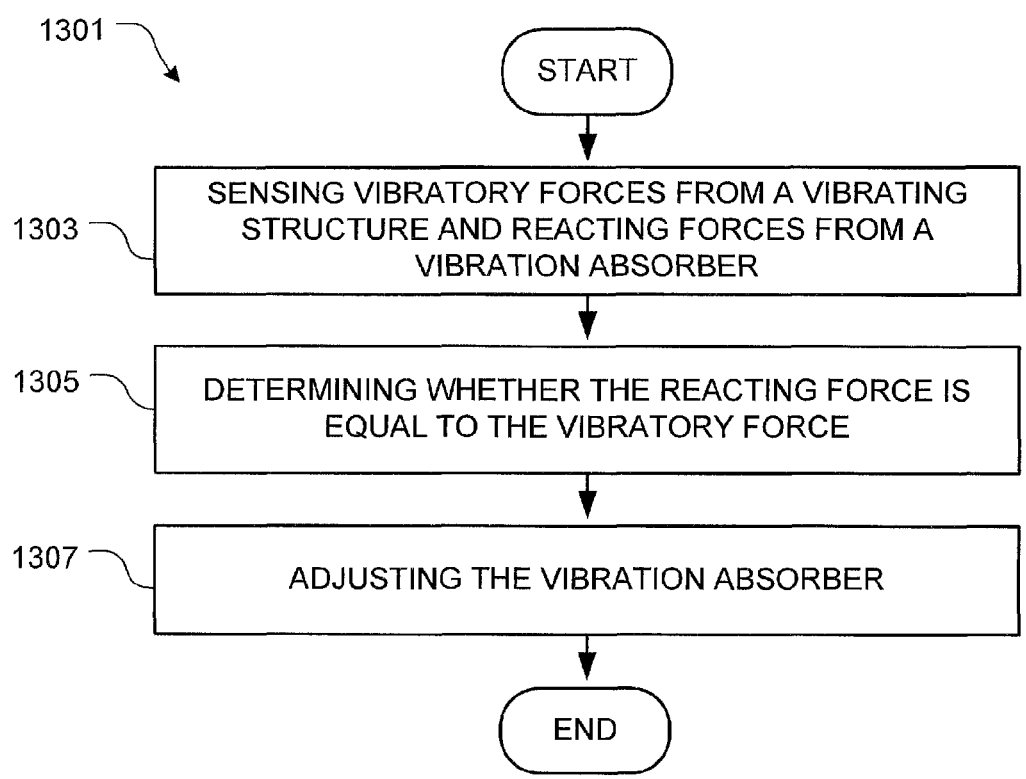
FIG. 13 is a flowchart of the preferred method.

FIG. 13 illustrates a flowchart 1301 of the preferred method for vibration control. It is contemplated utilizing the features of system 401 discussed herein as means for controlling vibrations. Box 1303 illustrates the first step, which includes the process of sensing the vibrations of the vibrating structure and the absorber. Thereafter, the sensed data is relayed to the control unit and analyzed with one or more control algorithms, as indicated in box 1305. The processes for analyzing the signals are discussed above and hereby incorporated in this preferred method. Finally, if adjustment is required, the control unit commands the driver to adjust the absorber accordingly, as depicted in box 1307. It is contemplated determining the fluctuations of the vibrations in a real-time fashion, wherein the system continuously monitors the vibrations and adjusts the absorber accordingly.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. An aircraft, comprising;
   a vibrating structure creating a vibrating force; and
   a vibration system, having:
      an adjustable vibration absorber that creates a reacting force in response to the vibrating force;
      a driver rigidly attached to the vibrating structure and operably associated with the vibration absorber;
      a sensor system, having:
         a first sensor associated with the vibration absorber;
         a second sensor associate with the vibrating structure; and
      a control unit in data communication with both the sensor system and the driver, the control unit being configured to analyze a first signal from the first sensor and a second signal from the second sensor and configured to command the driver to adjust the vibration absorber, the control unit, having:
         an algorithm, having:
            a linear envelope detector;
            a differentiator; and
            a sign comparator;
         wherein the first signal and the second signal pass through the linear detector for determining a first amplitude of the first signal and a second amplitude of the second signal, then a slope of a ratio of the first amplitude and the second amplitude is determined with the differentiator and is compared with the sign comparator;
   wherein the vibration system continuously analyzes the vibrating force and the reacting force for determining whether adjustment of the vibration absorber is required; and
   wherein if the slope is not equal to zero, then the vibration absorber is adjusted accordingly.

2. The aircraft of claim 1, further comprising:
   a main mass cantilevered at a spaced relationship relative to the vibrating structure.

3. The aircraft of claim 2, further comprising:
   a flexible beam for cantilevering the main mass relative to the vibrating structure.

4. The aircraft of claim 3, wherein the flexible beam is moveable relative to the vibrating structure.

5. The aircraft of claim 2, further comprising:
an auxiliary mass cantilevered at a spaced relationship relative to the vibrating structure;
wherein the spaced relationship of the auxiliary mass relative to the vibrating structure is adjusted via the driver.

6. The aircraft of claim 5, further comprising:
a linkage rigidly attached to the auxiliary mass and operably associated with the driver;
wherein the driver selectively adjusts the spaced relationship of the auxiliary mass relative to the vibrating structure via the linkage.

7. The aircraft of claim 1, the control unit comprising:
an algorithm, having:
    an analog multiplier; and
    a dynamic detector;
    wherein the first signal and the second signal are multiplied together in the analog multiplier, then passed through the dynamic detector for determining the relative phase angle between the first signal and the second signal.

8. The aircraft of claim 7, wherein the algorithm determines whether the relative phase angle is equal to 90 degrees, and if so, then the vibration absorber is not adjusted, else, the control unit commands the driver to adjust the vibration absorber until the relative phase angle is equal to 90 degrees.

9. A vibration system for a vibrating structure, comprising:
an adjustable vibration absorber, having:
    a first spring element coupled to the vibrating structure and a main absorber mass;
    a second spring element spaced from and extending relatively parallel to the first spring element, the second spring element being coupled to the vibrating structure and the main absorber mass; and
    a driver disposed between the first spring element and the second spring element for adjusting the spaced relationship therebetween;
a first sensor operably associated with the vibration absorber main mass;
a second sensor operably associate with the vibrating structure; and
    a control unit for controlling movement of the driver and a control unit in data communication with both the sensor system and the driver, the control unit being configured to analyze a first signal from the first sensor and a second signal from the second sensor and configured to command the driver to adjust the vibration absorber, the control unit, having:
        an algorithm, having:
            a linear envelope detector;
            a differentiator; and
            a sign comparator;
        wherein the first signal and the second signal pass through the linear detector for determining a first amplitude of the first signal and a second amplitude of the second signal, then a slope of a ratio of the first amplitude and the second amplitude is determined with the differentiator and is compared with the sign comparator;
wherein if the slope is not equal to zero, then the vibration absorber is adjusted accordingly;
wherein the vibration system continuously analyzes a vibrating force from the vibrating structure and a reacting force from the absorber for determining whether adjustment of the vibration absorber is required; and
wherein if adjustment of vibration absorber is required, the control unit commands the driver to adjust the spaced relationship between the first and second spring elements.

10. A method to adjustably create a reacting force in response to a vibrating force exerted on an absorber spring and mass system by a vibrating structure, the method comprising:
attaching a driver to the vibrating structure, the driver being operably associated with an adjustable absorber configured to create the reacting force;
sensing the reacting force with a first sensor and the vibrating force with a second sensor;
relaying a first signal from the first sensor and a second signal from the second sensor to a control unit;
determining whether adjustment of the absorber is required by analyzing the first signal and the second signal with a control algorithm associated with the control unit;
determining a first amplitude of the first signal and a second amplitude of the second signal;
determining a slope of a ratio of the first amplitude and the second amplitude with a differentiator;
comparing the slope with a sign comparator; and
adjusting the vibration absorber accordingly;
wherein if the slope is not equal to zero, then the vibration absorber is adjusted accordingly.

11. The method of claim 10, wherein:
adjusting the vibration absorber is achieved by moving a cantilevered mass relative to the vibrating structure; and
suspending the mass relative to the vibrating structure via a linkage operably associated with the driver.

12. The method of claim 11, further comprising:
telescopically extending the linkage relative to the vibrating structure.

* * * * *